US005638157A

United States Patent [19]

Nakaoka et al.

[11] Patent Number: 5,638,157

[45] Date of Patent: Jun. 10, 1997

[54] FILM PROCESSING APPARATUS

[75] Inventors: Nobuaki Nakaoka; Yuji Haruta, both of Wakayama, Japan

[73] Assignee: Noritsu Koki Co., Ltd., Wakayama-ken, Japan

[21] Appl. No.: 531,091

[22] Filed: Sep. 20, 1995

[30] Foreign Application Priority Data

Sep. 21, 1994 [JP] Japan .................................... 6-226662
Sep. 21, 1994 [JP] Japan .................................... 6-226663

[51] Int. Cl.$^6$ ............................ G03D 15/10; G03B 27/62

[52] U.S. Cl. ................................... 355/75; 226/25; 355/29

[58] Field of Search ............................... 226/25; 242/615, 242/615.4, 348.4, 55; 355/18, 29, 75, 13; G03D 15/10; G03B 27/62

[56] References Cited

U.S. PATENT DOCUMENTS

| | | | |
|---|---|---|---|
| 3,722,773 | 3/1973 | Plate et al. | 226/25 |
| 3,823,888 | 7/1974 | Zangenfeind et al. | 242/55 |
| 4,013,357 | 3/1977 | Nakajima et al. | 355/13 |
| 4,286,869 | 9/1981 | Kogane et al. | 355/75 |
| 5,374,975 | 12/1994 | Amat | 355/75 |

FOREIGN PATENT DOCUMENTS

| | | |
|---|---|---|
| 516105 | of 1992 | European Pat. Off. . |
| 04093930 | of 1992 | Japan . |
| 03242632 | of 1992 | Japan . |

*Primary Examiner*—Arthur T. Grimley
*Assistant Examiner*—Herbert V. Kerner
*Attorney, Agent, or Firm*—Felfe & Lynch

[57] ABSTRACT

A film processing apparatus includes a film inserting device operable to receive negative film strips cut into a predetermined length and transported from a film transporting device and then to insert the film strips one after another into each independent film-holding pocket of a film sheet holder. A planar member is disposed adjacent an inserting opening of the film sheet holder and displaceable by contacting the film being transported. In association with the planar member, a jamming detection sensor is provided for detecting a jammed condition of the film according to a displacement of the planar member.

14 Claims, 5 Drawing Sheets

FILM PROCESSING APPARATUS

BACKGROUND OF THE INVENTION

1. Field of the Invention

The present invention relates to a film processing apparatus for cutting a negative film strip into separate pieces and automatically inserting each separate film piece into a negative-film sheet holder. More particularly, the invention relates to a film processing apparatus of the above-noted type including a film inserting device operable to receive negative Film strips cut into a predetermined length and transported from a film transporting device and then to insert the film strips one after another into each independent film-holding pocket of the negative-film sheet holder to be stored therein.

2. Description of the Related Art

With a film processing apparatus of the above type, the cutting operation of a negative film strip and the inserting operation of the cut film piece into the film sheet holder are automatically effected in series. Therefore, if a jamming trouble occurs in the course of film transportation, this may lead to such a serious consequence as breakage of the film per se. In particular, at the position where the film piece is inserted into the film sheet holder, such jamming of the negative film may result in breakage of the relatively soft and delicate film sheet holder by the jammed film which is rather stiff in comparison with the sheet holder. Then, this will give trouble not only in the transportation line of negative films but also in the transportation line of the film sheet holders. Accordingly, detection of film jamming is essential at this location in particular.

For the detection of film jamming, according to a construction provided by the convention, a bar-like member is disposed at the position on the film transporting passage defining a film inserting opening. This bar-like member is pivotable when contacting a jammed negative film. And, a jamming detection sensor is provided to be operable by the pivotal movement of the bar-like member.

According to the above-described conventional construction, however, as the jamming is detected by means of the bar-like member, because of this shape, the detectable area of the member is inevitably limited. For instance, depending on the condition of the jamming, such as when a side edge of the film comes into engagement with the bar-like member disposed at the width-wise center of the film or when a curled leading end of the film strip comes into engagement with the bar-like member, it takes some time for the sensor to detect the jamming. Thus, even if the sensor may detect the jamming, this detection may be too late. So that, the sensor cannot fully achieve its original object.

In view of the above-described state of the art, the primary object of the present invention is to provide a film processing apparatus which allows immediate and reliable detection of jamming trouble of films.

SUMMARY OF THE INVENTION

For fulfilling the above-noted object, a film processing apparatus, according to the present invention, comprises:

a film inserting device operable to receive negative film strips cut into a predetermined length and transported from a film transporting device and then to insert the film strips one after another into each independent film-holding pocket of a film sheet holder;

a planar member disposed adjacent an inserting opening of the film sheet holder and displaceable by contacting the film being transported; and a jamming detection sensor for detecting a jammed condition of the film according to a displacement of the planar member.

With the above-described construction, a jammed condition of the film is detected by the member which is formed like a plate, rather than a bar. Then, if this planar member is disposed so as to cover the entire width of the negative film under transportation, even when the jamming occurs due to a hooked condition of one side edge of the film, displacement of the planar member immediately occurs by its contact with this film and the jamming detection sensor is activated without delay according to this displacement. That is to say, the above construction allows detection over a wider area than the conventional construction described supra.

As a result, regardless of the type of the condition of the jamming, the jamming may be detected immediately, so that any remedy measure such as suspending the film transportation may be taken timely. Hence, such serious consequence as the bending or even breakage of the negative film may be avoided more reliably. Consequently, the invention has achieved its intended object of providing a film processing apparatus which allows immediate and reliable detection of jamming trouble of films and which therefore may continuously effect the automatic operation for a long period of time with high operational efficiency.

According to a further aspect of the present invention, the planar member acts also as a guide for guiding the film in an introducing passage of the film into the sheet holder.

With this construction, the planar member, which is provided originally for the purpose of detection of jamming, acts also as a guide for the film. Hence, the construction provided for the jamming detection may be utilized also for the transportation of the film. Further, if this guide, which acts also as the detecting member, is formed so as to extend not only in the vicinity of the film introducing opening but also to extend farther to a more upstream side relative than the opening, then, the detectable range of the film jamming may be advantageously extended in the longitudinal direction of the film also.

Then, as the the planar member for jamming detection is utilized also as the film transport guide, the number of necessary components may be reduced. Further, the jamming detection becomes possible for an extended range in the longitudinal direction of the film. As a result, the film processing apparatus having the above-described additional features is further superior as being capable of detecting a film jamming trouble still more reliably.

According to a still further aspect of the present invention, a film transport passage extending from a photographic printer device to the film inserting device detachably includes a manual feed guide for allowing a manual feeding of a negative film strip to the film transporting device.

With the above construction, in addition to the normal type of operation described supra in which a negative film strip is automatically transported from the photographic printer device to be inserted into a film sheet holder, this construction allows the further possibility of independent use of the film inserting device. For instance, when necessity arises for insertion of a film into the sheet holder by manual feeding of the film because of e.g. difference of the type of the film or necessity of special printing operation, the manual feed guide may be attached to the film transporting passage extending From the photographic printer device to the film inserting device. So that, by using this manual feed guide, the transported film may be smoothly fed to the Film transporting device manually.

As a result, in case the film needs to be transported manually, unlike the conventional construction, the above construction eliminates the necessity of temporary detachment of a negative mask of the printing device. Thus, the manual transportation is possible with the simple operation of attaching the manual feed guide to the film transporting passage. Moreover, as the film may be smoothly fed to the film transporting device as being guided by the manual feed guide, occurrence of such trouble as film jamming at the time of its insertion may be restricted. So, the manual feeding operation may be effected speedily and smoothly. Accordingly, the film processing apparatus with this feature is more convenient and causes less trouble.

According to a still further aspect of the invention, the film transporting passage includes an opening portion for forming a loop of the film being transported in order to absorb difference in film processing speeds between the upstream side and the downstream side; and the manual feed guide is detachably attached to the film transporting passage with the opening portion being opened.

With the above construction, for processing a film strip having a significant length for instance, the opening portion formed in the film transporting passage is opened up to form a loop of the film, so that the processing of this film may be effected smoothly even when there exists difference in the processing speeds between the upstream side and the downstream side. Further, in case a manual transportation is needed, this means that the processing is to be effected on a film which has been already cut, so that there is no necessity of forming such loop. Then, by effectively utilizing the above construction to allow attachment and detachment of the manual feed guide at this location when desired, it is possible to avoid providing an additional arrangement dedicated to the purpose of attachment/detachment of the manual feed guide.

As a result, the construction for allowing smooth film transportation regardless of processing speed difference may be effectively utilized also for the attachment and detachment of the manual feed guide. Then, the number of the necessary components may be reduced to render the construction simple and less costly.

According to a still further aspect of the invention, the manual feed guide includes an arcuate guide face for guiding the film from the downstream side in the film transporting direction to a direction converging with the film transporting passage.

With this construction, by using the arcuate guide face, the film may be manually transported from the downstream side into the film transporting passage smoothly and easily. In general, the film processing devices such as a developing device and a printer device have significant height to extend rather far above the film transporting device. Yet, with the above construction, a film may be manually fed and transported with ease from the downstream side with holding the film with a posture in much free space free from other obstacles.

As a result, the manual feeding operation may be effected easily and efficiently.

According to a still further aspect of the present invention, a pair of said guide faces are provided across the film inserting passage in opposition to each other in the film transporting direction; and a distance between the two guide faces increases towards the manual feed inserting opening of the manual feed guide.

With the above construction, the film manually fed may be reliably guided to the film transporting passage by causing the film to pass between the pair of guide faces. Furthermore, since the distance between the pair of guide faces is gradually increased towards the introducing opening. An operator may readily feel and find the introducing opening for the manual feeding of the film. Thereafter, the fed film may be properly oriented as being guided through the gap between the guide faces which gap is gradually reduced.

As a result, the manual feeding operation may be effected still more efficiently.

According to a still further aspect of the invention, of the pair of guide faces, the one guide face disposed on the downstream side in the film transporting direction has a curvature smaller than a curvature of the other guide face disposed on the upstream side.

With this construction, the upstream guide face is provided with the relatively greater curvature. Hence, a film manually fed from the downstream side in the film transporting direction may be gently received and guided by the upstream guide face having the greater curvature, thereby to preclude the possibility of occurrence of trouble such as bending of the film.

As a result, damage to the film may be decreased and the manual feeding operation may be effected in a more efficient and trouble-free manner.

Further and other objects, features and effects of the invention will become more apparent from the following more detailed description of the embodiments of the invention with reference to the accompanying drawings.

DESCRIPTION OF THE PREFERRED EMBODIMENTS

Preferred embodiments of the present invention will be described in particular with reference to the accompanying drawings.

Figure 1:
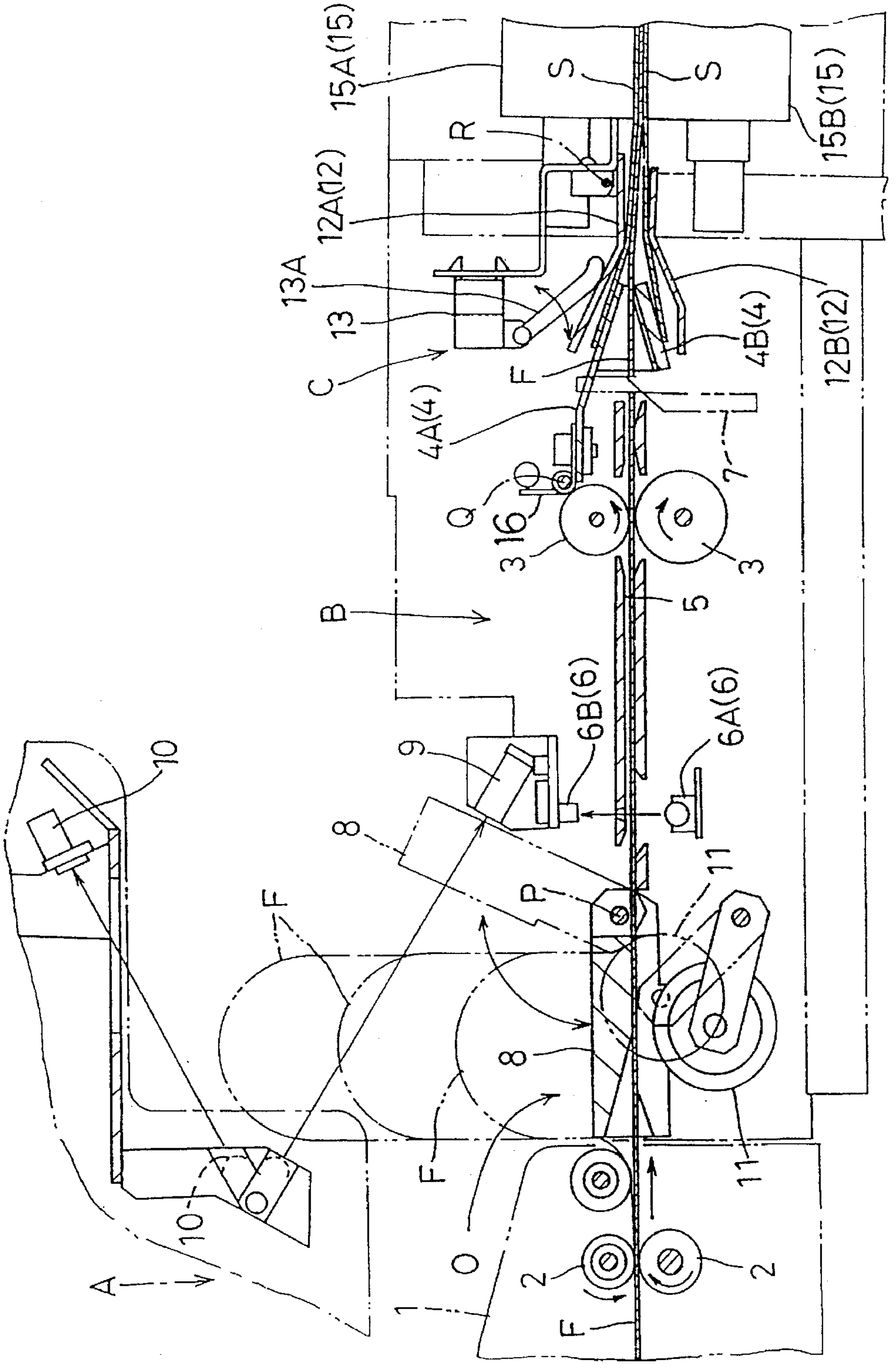
FIG. 1 is a side view of a film processing apparatus.

As shown in FIG. 1, a film processing apparatus includes, as a serially connected assembly, a printer device A for developing an image of an exposed negative film and printing the image onto a print paper, a film transporting device B for receiving the negative film F transported from a print-assisting automatic negative mask 1 provided at the final processing stage of the printer device A and then transporting this negative film F to the right-hand direction in the figure, and a film inserting device C for automatically and serially inserting the negative film F transported by the film transporting device B into each independent film-holding pocket of a film-storing sheet holder S which is transported in a direction normal to the plane of the figure in synchronism with the transportation of the film F.

With the film processing apparatus described above, the negative film F, after a printing operation (example of film processing operation) thereof using the automatic negative mask 1, is pushed by a drive roller pair 2 provided within the negative mask 1 to be advanced to the right-hand direction in the figure and then this film F is received by a further drive roller pair 3 provided within the film transporting device B to be advanced further to the right to eventually reach the film inserting device C. In this film inserting device C, the negative film F is guided by a pair of upper and lower film inserting guides 4A, 4B to be pushed through a vertically opened film inserting opening into each film-holding pocket of the film sheet holder S. At an intermediate portion of the film transporting device B, a light emitting element 6A and a light receiving element 6B of an optical sensor 6 are disposed in opposition to each other across a film transporting passage 5 for counting the number of image frames of the negative film. When this optical sensor 6 has counted up a predetermined number of image frames; in other words, when a predetermined length of negative film F is detected, the negative film strip F is cut by means of a cutter 7. In the manner described above, while the negative film F is continuously fed, cut film pieces each having the predetermined length may be inserted one after another into the respective film-holding pockets of the film sheet holder S.

Further, on the upstream side relative to the film transporting device B, there is provided an opening/closing guide 8 which normally constitutes a part of the film transporting passage 5 and which is pivotable about an axis P by an action of an unillustrated solenoid to open up this film transporting passage 5. This opening/closing guide 8 is kept closed when e.g. a reprinting operation is to be effected using a negative film F which is already cut, and the guide 8 guides this negative film F using its guide face. On the other hand, when a long negative film strip F is transported in the case of a simultaneous printing operation in which the long and un-cut exposed film is developed and then a printing operation of this film is effected immediately thereafter, the guide 8 is pivotably opened to form an opening portion O as indicated by a two-dot chain line in the figure, so as to allow formation of a loop of the negative film F. This loop of the negative film F is formed for the purpose of absorbing difference which may be present in the processing speeds between e.g. the transporting speed of the film F and the speed of a printing operation described infra. More specifically, the leading end of the film F is pinched between the drive roller pair 3 to suspend the advancement of the film and then the loop is formed. Then, when this loop is detected by a pair of sensors 9, the suspended condition of the film transportation is released to resume the transportation. Incidentally, a reference numeral 10 in the figure denotes an optical sensor pair for detecting the limit of the loop formation, a numeral 11 denotes an assist roller for pushing up the film F from the under to form its loop in the upper area.

In the film inserting device C, adjacent an insertion opening of the film sheet holder S, there are provided a pair of plate members 12A, 12B, with the upper plate member 12A being pivotable. Further, there is provided a jamming detection sensor 13 comprised of a limit switch and activatable in association with a pivotal movement of the plate member 12A caused by its contact with the negative film F. On the upstream side in the transporting direction of the film F relative to the pair of plate members 12A, 12B, there are pivotably attached film insertion guides 4A, 4B comprised of a pair of upper and lower guides fixed to each other at the center portions thereof. In operation, when the film insertion guides 4A, 4B are pivoted by contact with the film F to come into contact with and push up the upper plate member 12A, the jamming detection sensor 13 is activated in this case also like the case described supra.

Figure 2:
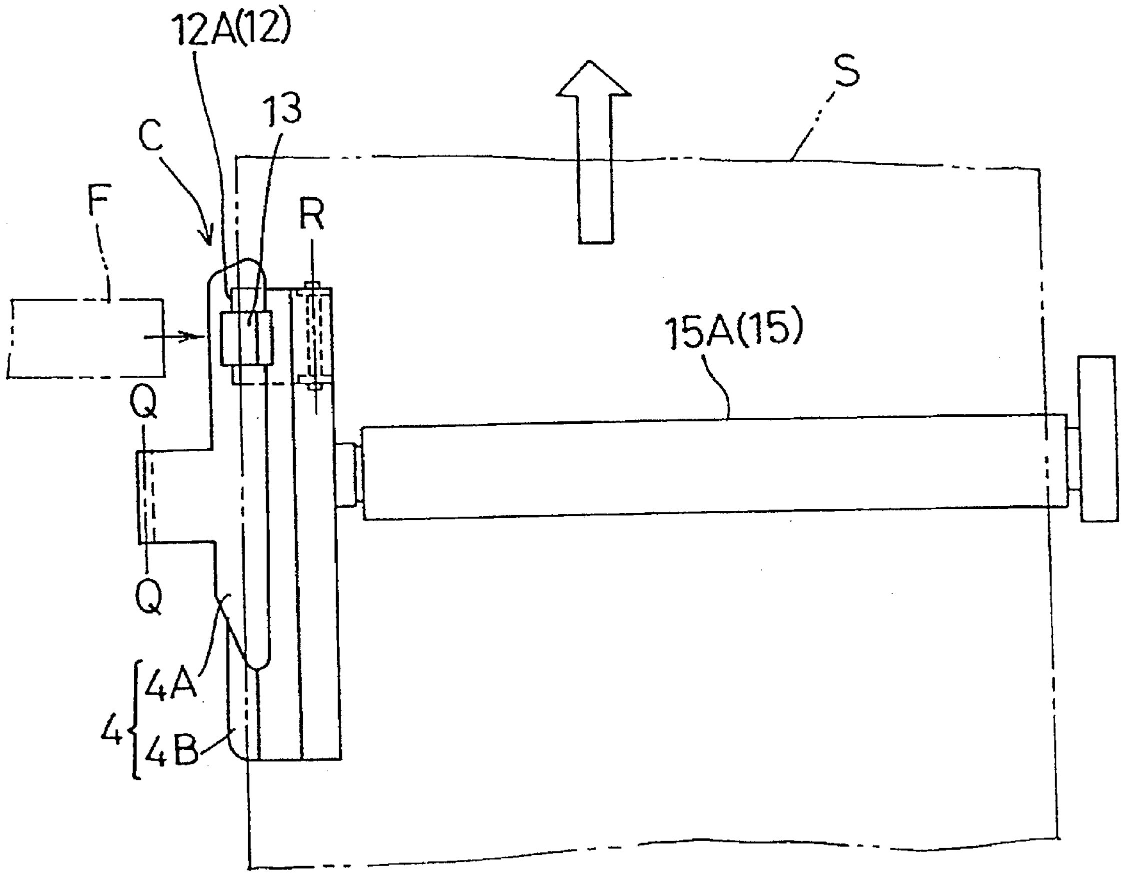
FIG. 2 is a plan view of a film inserting device.

The above construction for inserting the negative film F into the film sheet holder S in the film inserting device C will be more particularly described next. As shown in FIG. 2, in synchronism with the transportation of the film F, the film sheet holder S is transported by a pair of rollers 15A, 15B in the direction normal to the transporting direction of the film F. In the transport passage of the film sheet holder S on the side of the inserting opening of the sheet holder S, the pair of upper and lower film insertion guides 4A, 4B are provided, extending across the transport passage of the negative film F. In operation, as the film sheet holder S is being transported, and before the holder S is about to meet the film F until completion of insertion of the film F into the holder S, the film insertion guides 4A, 4B function to vertically extend the inserting opening of the pocket of the film sheet holder S to allow smooth insertion of the film F therein.

Next, the above-mentioned construction for the detection of jamming of the film F will be described in more details.

As shown in FIG. 1, at the inserting position of the film F, the film sheet holder S has its inserting opening extended vertically by the pair of upper and lower film insertion guides 4A, 4B. And, in correspondence with the film insertion guides 4A, 4B and sandwiching the extended opposed ends of the sheet holder S from the above and under, the pair of plate members 12A, 12B are disposed. The film insertion guides 4A, 4B are attached to be pivotable about an axis Q, behind which a detecting portion 13A of the jamming detection sensor 13 is disposed. A spring 16 biases the film insertion guides 4A, 4B clockwise about the axis Q. The detecting portion 13A is pivotable about an axis 13B. And, this detecting portion 13A is biased, by an unillustrated spring, clockwise about the axis 13B so as to constantly maintain its contact with the upper plate member 12A. Further, this upper plate member 12A is attached to be pivotable about an axis R.

Next, a detection operation of jamming of the negative film F using the above-described construction will be elaborated.

Figure 3:
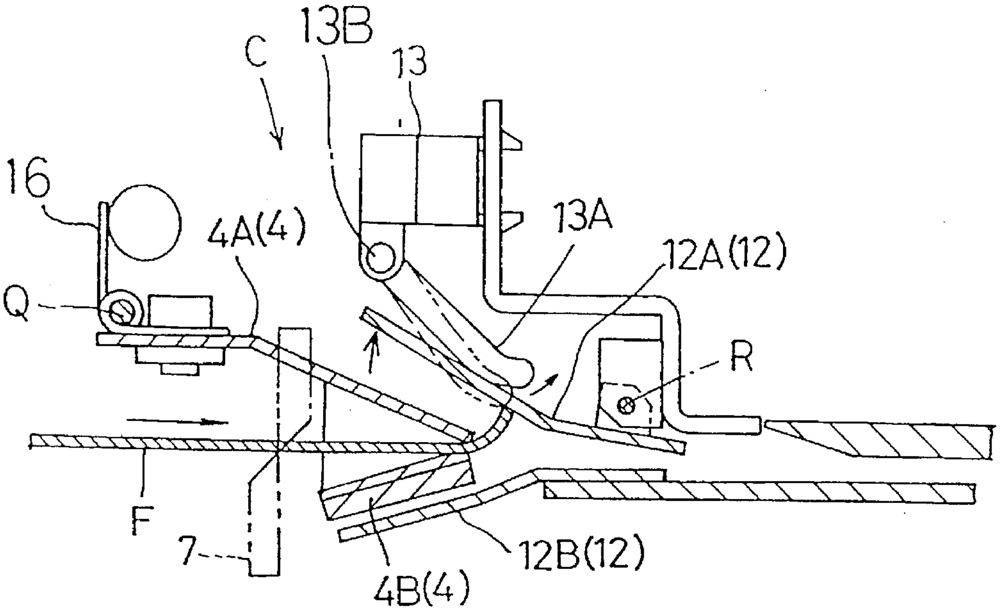
FIG. 3 is a side view of major portions under a condition where a film jamming trouble has occurred.

From the normal film inserting condition shown in FIG. 1, if a negative film F having an upward curled portion is transported; then, as shown in FIG. 3, this curled portion of the film pushes the upper plate member 12A, as one example of a planar member in the invention, to cause this plate member 12A to pivot upwards, thereby to activate the jamming detection sensor 13. That is, because of the use of the plate member 12A, i.e. a planar or plate-like detecting member having a large detectable range, the hooking trouble of the negative film F having such curled leading edge, which trouble is not detectable by the conventional bar-like detecting member, too may be detected reliably, thereby to preclude serious consequence.

Figure 4:
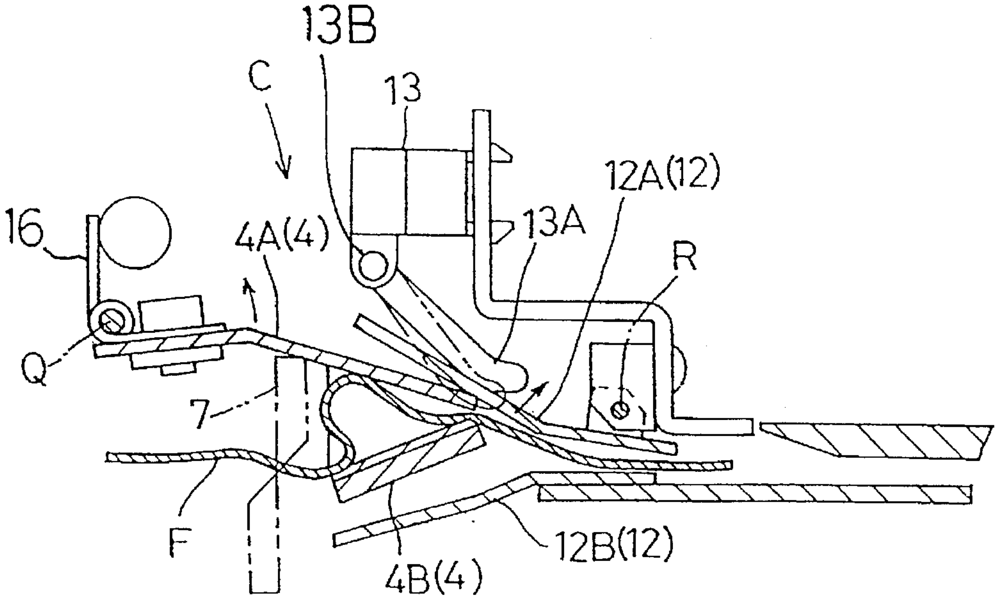
FIG. 4 is a side view of the major portions under a condition where a film jamming trouble has occurred in a different manner.

Further, if jamming of the film F occurs at the location of the film insertion guides 4; that is, jamming of the film F occurs due to hooking of the film having a curled leading edge described supra or due to bending in the middle of the film F during its transportation; then, as illustrated in FIG. 4, development of the film jamming causes the upper film insertion guide 4A to pivot upwards to raise the upper plate member 12A, whereby the jamming detection sensor 13 is activated in this case also like the above-described case. That is, the film insertion guides 4A, 4B too comprise an example of the planar member in this invention. As the construction for the detection of jamming of the film F is utilized also as the guiding construction for guiding insertion of the film F into the film sheet holder S, jamming of the film F may be detected over an extended range. Hence, the film insertion guides 4A, 4B comprise a first planar member, and the plate member 12A comprises a second planar member.

A film processing operation using this film processing apparatus is carried out normally in the above-described manner. Yet, if the negative film F comprises e.g. a half-size film, the orientation of image recorded on this film differs by 90 degrees from that of the normal, i.e. the full-size type film described above. Hence, in this case, though not illustrated, in the printer device A, the automatic negative mask 1 will be attached in the direction perpendicular to the normal attaching direction; and in this condition, the film F is transported and a printing operation of the same is effected. In this special case, the above-described construction cannot be used as it is for the transportation of the negative film F; that is, in this case, the film F discharged from the automatic negative mask 1 cannot be directly received, in this condition, by the film transporting device B to be transported thereby. Therefore, in order to allow the possibility of efficient inserting operation of the film F into the film sheet holder S by using the film inserting device C in this special case also, the negative film F needs to be manually fed to the film transporting device B. Further, the same necessity arises also in case such a special operation as a manual printing operation, a trimming operation or the like has been effected.

Figure 5:
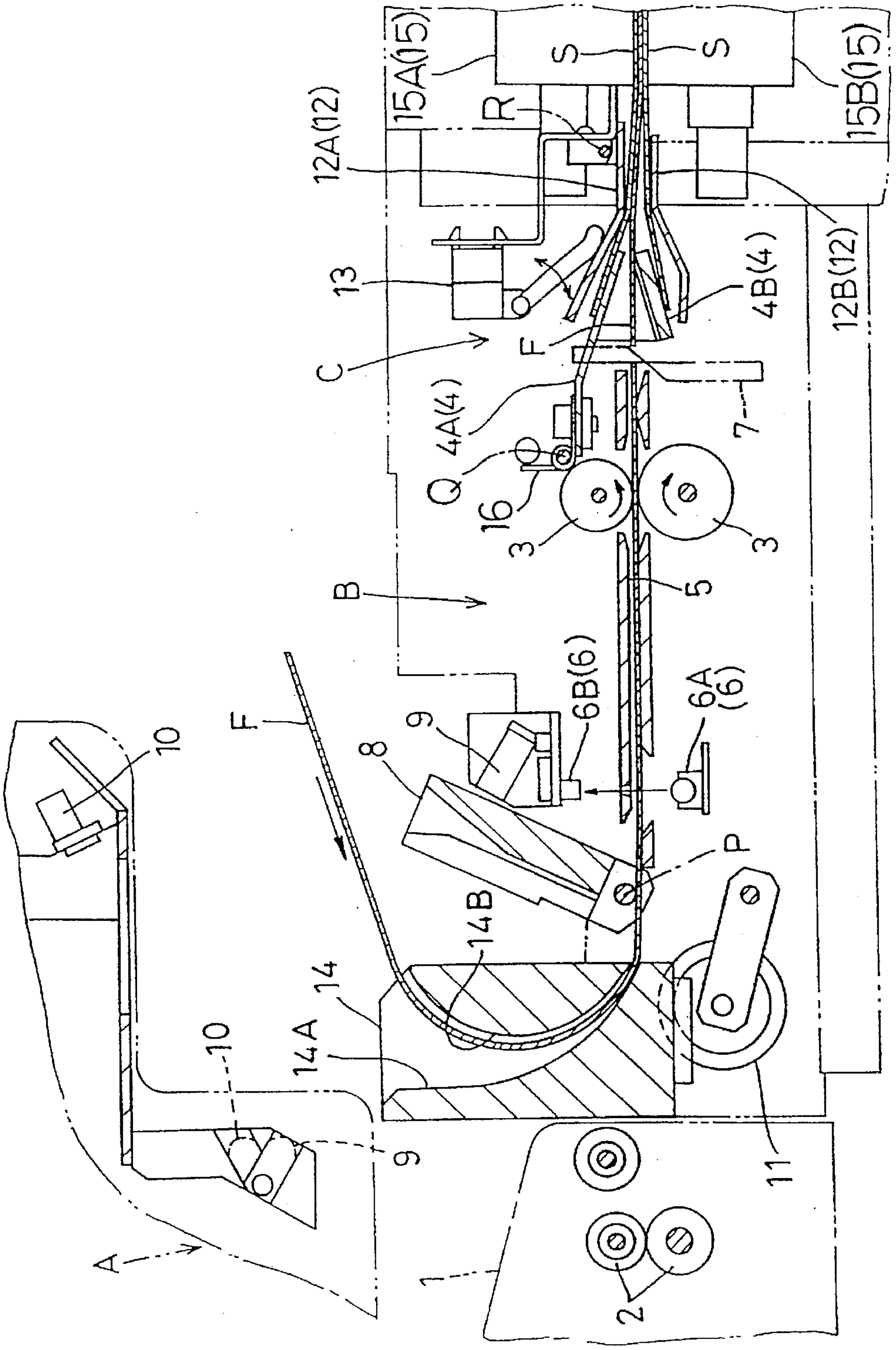
FIG. 5 is a side view of the film processing apparatus with a manual feed guide attached thereto.
Figure 6:
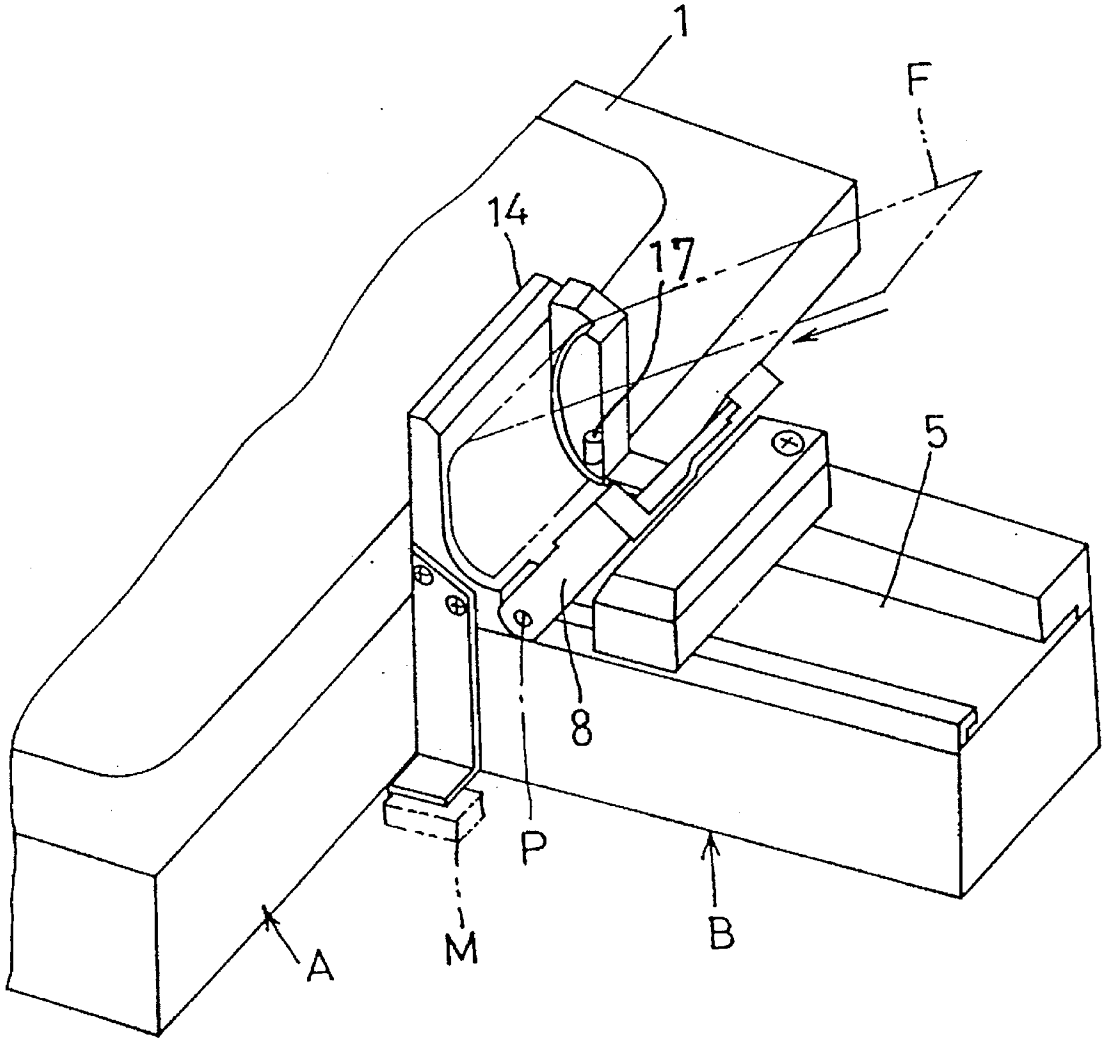
FIG. 6 is a perspective view of the major portions of the film processing apparatus with the manual feed guide attached thereto.

In order to cope with the above necessity, in the film processing apparatus of the present invention, as shown in FIGS. 5 and 6, a manual feed guide 14 is detachable attached to the film transporting passage 5 for allowing manual feeding of the film F to the drive roller pair 3 of the film transporting device B. This manual feed guide 14 may be detachably attached, by means of a magnet M and a positioning pin 15, to the film transporting passage 5 with the opening/closing guide 8 described supra being pivoted to form the opening portion O. Further, with this manual feed guide 14 in operation, the negative film F inserted from the right-hand side, i.e. the downstream side in the film transporting direction as illustrated in FIG. 5, is reversed by a pair of opposing arcuate guide faces 14A, 14B and introduced in this state on to the film transporting passage 5. That is, regardless of the vertically extended configuration of the printer device A which extends above the film transporting device B, the manual feed operation may be effected smoothly and readily from a position free from obstacles. Moreover, the gap between the pair of guide faces 14A, 14B is formed greater on the side of the manual inserting opening than on the opposite side, and the downstream guide face 14B has a smaller curvature than the upstream guide face 14A. With these arrangements, the manual insertion opening is formed relatively large to allow easier and smoother manual insertion, and also the inserted film F may be gently received and guided by the upstream guide face 4A having the larger curvature, so that the manual feeding operation of the film F and transporting operation thereafter may be effected without the possibility of such trouble as bending of the leading end of the film.

[other embodiments]

(1) In the foregoing embodiment, as the planar members of the present invention, the upper plate member 12A and the upper film insertion guide 4A are pivotably disposed in the vicinity of the insertion opening of the film sheet holder S. Instead of this, the construction may employ only one of the above. That is to say, the planar member of this invention does not necessarily co-act as a film guide. Or, conversely, a planar member of any other type may be employed for detecting jamming trouble of the film F.

(2) In the foregoing embodiment, the upper plate member 12A and the film insertion guides 4A, 4B are rendered movable and the corresponding jamming detection sensor 13 is provided only on the upper side. Instead or in addition to this, the lower plate member 12B and/or the lower film insertion guide 4B may be constructed to be pivotable, and correspondingly a further jamming detection sensor may be provided on the lower side also. Various other modifications are also conceivable such as providing a ink means for activating the jamming detection sensor 13 described in the foregoing embodiment.

(3) Moreover, for activating the jamming detection sensor 13 in association with displacement of the plate members 12A, 4A, any other type of sensor constructions such as an optical sensor, a magnetic sensor or the like may be employed, instead of the mechanical type sensor construction described in the foregoing embodiment.

(4) In the foregoing embodiment, the film transporting device B transports a negative film F after its developing operation and printing operation. The invention is not limited to this construction. Alternatively, the apparatus of the invention may process a negative film F after its developing operation alone. Hence, the device including, in any desired combination, these units such as the developing unit, the printing unit or the like for effecting such operations as a developing operation and a printing operation, is generically called herein as the printer device A.

(5) The specifics of the manual feed guide 14 such as its shape and material, construction of the film guides, construction of the attaching means to the film transporting passage 5 and so on may be varied depending on the necessity. For instance, this manual feed guide 14 may be attached only by screws. Or, in order to facilitate its attachment and detachment, the guide may employ a one-touch attachment arrangement using a spring-loaded mounting member. Further, the opposing guide faces 14A, 14B may form a uniform gap therebetween, in place of the varying gap. Further, the magnitudes of the curvatures of these guide faces 14A, 14B may be reversed in accordance with transporting direction by manual feeding. Still further, the manual feed guide 14 may be constructed so as to be attached to any other portion than the opening portion 0 of the film transporting passage 5.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A film processing apparatus comprising:

a film inserting device operable to receive negative film strips cut into a predetermined length and transported from a film transporting device and then to insert the film strips one after another into each independent film-holding pocket of a film sheet holder;

a planar member disposed adjacent an inserting opening of the film sheet holder and displaceable by contacting the film being transported; and a jamming detection sensor for detecting a jammed condition of the film according to a displacement of the planar member.

2. A film processing apparatus as defined in claim 1, wherein said planar member acts also as a guide for guiding the film in an introducing passage of the film into the sheet holder.

3. A film processing apparatus as defined in claim wherein said planar member includes;

a first planar member operable to guide the film to the inserting opening of the film sheet holder, and a second planar member displaceable by contact with said first planar member when the first planar member comes into contact with the film.

4. A film processing apparatus as defined in claim 3, wherein said jamming detection sensor is activated in association with displacement of either said first planar member or said second planar member.

5. A film processing apparatus as defined in claim 3, wherein said first planar member is disposed on the upstream side in the transporting direction of the film relative to said second planar member.

6. A film processing apparatus as defined in claim 1 , wherein said jamming detection sensor comprises a limit switch activatable in association with displacement of said planar member.

7. A film processing apparatus as defined in claim 2, wherein said planar member includes a pair of upper and lower film insertion guides.

8. A film processing apparatus as defined in claim 1 , wherein said jamming detection sensor comprises a sensor for optically or magnetically detecting displacement of said planar member.

9. A film processing apparatus as defined in claim 3, wherein said jamming detection sensor comprises a sensor for optically or magnetically detecting displacement of said second planar member.

10. A film processing apparatus as defined in claim 1, further comprising:

a manual feed guide detachably attached to a film transport passage extending from a photographic printing device to the film inserting device, said manual feed guide allowing a manual feeding of the negative film strip to the film transporting device.

11. A film processing apparatus as defined in claim 10, wherein said film transporting passage includes an opening portion for forming a loop of the film being transported in order to absorb difference in film processing speeds between the upstream side and the downstream side; and the manual feed guide is detachably attached to the film transporting passage with the opening portion being opened.

12. A film processing apparatus as defined in claim 10, wherein said manual feed guide includes an arcuate guide face for guiding the film from the downstream side in a direction converging with the film transporting passage.

13. A film processing apparatus as defined in claim 10, wherein a pair of said guide faces are provided across the film inserting passage in opposition to each other in the film transporting direction; and a distance between the two guide faces increases towards the manual feed inserting opening of the manual feed guide.

14. A film processing apparatus as defined in claim 13, wherein of the pair of guide faces, the one guide face disposed on the downstream side in the film transporting direction has a curvature smaller than a curvature of tile other guide face disposed on the upstream side.

* * * * *